United States Patent [19]

Millet

[11] Patent Number: 5,003,612

[45] Date of Patent: Mar. 26, 1991

[54] METHOD OF IDENTIFICATION OF A PRODUCT FOR THE PURPOSE OF PREVENTING FRAUD AND DEVICE FOR CARRYING OUT THIS METHOD

[75] Inventor: Jean-Claude Millet, Bourg les Valence, France

[73] Assignee: Image S.A., Bourg les Valence, France

[21] Appl. No.: 253,412

[22] Filed: Oct. 4, 1988

Related U.S. Application Data

[63] Continuation of Ser. No. 840,578, filed as PCT FR85/00131 on May 28, 1985, published as WO85/05713 on Dec. 14, 1985, abandoned.

[30] Foreign Application Priority Data

May 29, 1984 [FR] France ................ 84 08630

[51] Int. Cl.⁵ .............................................. G06K 9/18
[52] U.S. Cl. ........................................ 382/11; 283/73; 283/81; 380/28; 382/1
[58] Field of Search ............. 382/1, 11, 56; 380/23, 380/26, 28, 51; 53/507; 283/72, 73, 81; 235/494

[56] References Cited

U.S. PATENT DOCUMENTS

| | | | |
|---|---|---|---|
| 3,709,525 | 1/1973 | Frank | 382/57 |
| 4,263,504 | 4/1981 | Thomas | 235/494 |
| 4,286,146 | 8/1981 | Uno et al. | 382/11 |
| 4,458,333 | 7/1984 | Smith | 382/56 |
| 4,545,066 | 10/1985 | Gascuel et al. | 382/11 |
| 4,637,051 | 1/1987 | Clark | 382/1 |

FOREIGN PATENT DOCUMENTS

| | | |
|---|---|---|
| 0097110 | 12/1983 | European Pat. Off. |
| 1133826 | 9/1960 | France . |
| 2181409 | 11/1973 | France . |
| 2401465 | 3/1979 | France . |
| 2450011 | 9/1980 | France . |
| 80/02757 | 12/1980 | PCT Int'l Appl. |

Primary Examiner—David K. Moore
Assistant Examiner—Joseph Mancuso
Attorney, Agent, or Firm—Roland Plottell

[57] ABSTRACT

This method consists in introducing a programmed defect at the writing level; the defect will be detected at the reading level by means of a key corresponding to the writing control algorithm which is known only to the user.

8 Claims, 1 Drawing Sheet

METHOD OF IDENTIFICATION OF A PRODUCT FOR THE PURPOSE OF PREVENTING FRAUD AND DEVICE FOR CARRYING OUT THIS METHOD

This is a continuation of co-pending application Ser. No. 07/159,848, filed as PCT JP87/00345 on May 28, 1987, published as WO87/07427 on Dec. 3, 1987, now abandoned.

The invention relates to a method for identification of a product with a view to preventing any fraud. It also relates to any device for carrying out this method.

The commercial success of a product often depends on the distinctive character and reputation which this product enjoys. It is therefore tempting for unscrupulous competitors to endeavor to take advantage of a customer by misleading him as to the true origin of his purchase. He thinks he is purchasing a product (x) with all its intrinsic properties and he is in fact purchasing a product (y) which only appears to be the same.

In the face of all attempts at unfair competition, each person therefore endeavors to find means for identifying and following his product, which make it possible at any time and in any place within the distribution channel:
- to check the correct origin of the product,
- to check whether the product concerned is in fact in its normal distribution zone,
- therefore to follow the product distribution channel geographically and chronologically from the production point to the point of sale of the product to the customer.

In the prior art, there are many existing methods which endeavor to solve this problem. The most simple is plain writing of the information on the product. This information is then read directly by the operator or by a conventional method of reading. Recourse is also had to writing and reading of a coded item of information of the bar-code type in which identification by reading of the code can be performed automatically.

All these written items of information from the most simple to the most advanced, are subject to a major disadvantage in that they can be copied, and in particular that they cannot always be easily written on substrates of various shapes which differ very considerably from flat surfaces, for example.

The present invention has for its object to overcome these disadvantages and relates to a method and its device for practical application which is capable of writing an item of information on a substrate irrespective of its profile, with the result that only the possessor of a key is capable of recognizing its authenticity and nevertheless of ensuring automatic reading of the information.

Method of identification of a product obtained by writing items of information; characterized in that it consists in performing the writing operation in matrix form, the dots in the matrix being isolated from each other; in introducing at least one defect in a predetermined algorithm; in performing a reading operation by scanning and identification of the written dots column by column in such a manner as to ensure that these reading means provided with a decoding key detect and identify the defect which has been purposely introduced.

The invention will be more clearly understood by means of the following explanations and by means of the accompanying five figures which illustrate diagrammatically a few non-limitative alternative embodiments of the invention.

Figures 1, 2, 3, 4, 5:
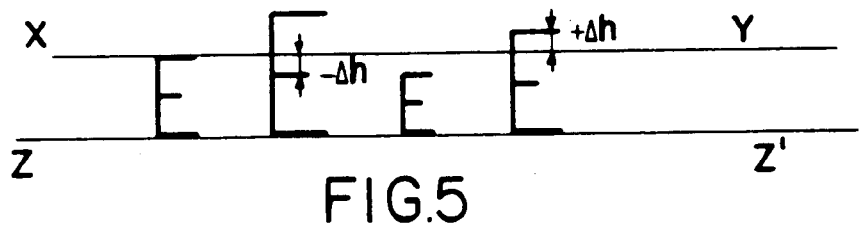
FIG. 1 is a matrix showing dots representing an E in accordance with an aspect of the invention.
FIG. 2 is a matrix showing dots representing a reverse E, a variant of the invention.
FIG. 3 is a matrix showing dots representing an inverted A, a further variant of the invention.
FIG. 4 is a matrix showing dots representing an E, a still further variant of the invention.
FIG. 5 is a drawing illustrating the letters E of variable height, in accordance with another embodiment of the invention.

In known methods for identification of characters, there is usually employed a structure of continuous characters; this is the case with the so-called readable fonts such as OCRA, OCRB, or ECRM.

In the present invention and in accordance with an important feature, preference is given to a structure of non-continuous characters in which each dot composing the matrix is completely isolated from the others, which is particularly accessible to ink-jet writing techniques.

Identification of the character is obtained by column-by-column scanning and identification of the position of the dots among the thirty-five possible positions in a $7 \times 5$ matrix, for example.

In accordance with another important feature of the invention and in order to guard effectively against fraud, a defect is intentionally created with well-determined addressing at the level of this matrix writing, said defect being subsequently detected automatically at the reading level on condition that the reading device comprises the corresponding decoding key.

There certainly exist different means which are capable of carrying out this dot-by-dot matrix writing operation but, as has been stated earlier, a technique which is particularly well-suited to the practical application of the invention is the ink-jet technique. In fact, control of the charge and therefore of the trajectory and the shape of the ink drops can readily be performed on the basis of an algorithm which is adapted to each application and therefore to each type of marking.

For example, as shown in FIG. 1, dots representing an E are printed in matrix form; each dot forms part of a matrix, for example of seven rows A, B, C, D, E, F, G, and of five columns a, b, c, d, e. In accordance with the invention, there is accordingly inserted into the control algorithm of the ink-jet printer a step having the function of creating at the writing level a defect which does not make the entire information unreadable but which can be automatically detected solely by the reading device on condition that it is adapted and therefore provided with a decoding key.

If addressing and the nature of the defect at the time of reading are in accordance with the instructions given at the time of writing, it is then certain that the marking under consideration is authentic and the product can therefore be identified as being in accordance with accepted standards and, by reading the information which it bears, the origin of the product and its routing are thus checked.

On the other hand, if the defect is absent or if its addressing is not in relation with the algorithm which has controlled the writing operation, an attempt has clearly been made to commit fraud.

An infinite quantity of combinations can be put into operation in order to authenticate the message which has been written. A certain number of examples are described below by way of example and not in any sense by way of limitation.

As shown in FIG. 1, a dot is removed from a character such as for example the one which corresponds to addressing (Ac) and (Db) without making the character illegible. According to the user and/or the product, it is thus possible to program an unlimited quantity of defects corresponding to a logic which has been initially imposed. For example, all the E's constituting the identification will be vitiated by this defect. The coding algorithm will then be implanted as a decoding algorithm which will be the key mentioned earlier.

The advantage of the ink-jet printer is immediately apparent since this technique is more particularly mastered in regard to the control operation, irrespective of the shape of the medium which need no longer be flat but can assume the most varied shapes.

The formation of these special characters leads to generation of these characters in accordance with a particular mode. Generally, in ink-projection printers of the continuous ink-jet type in particular, the character descriptor is stored in memory and writing of characters is performed by calling the selected character, which means that the 64 ASCII characters are usually stored in memory.

In the present invention, in order to make use of characters in a 7×5 matrix, the total number of 128 possible combinations of the seven dots will be created and the charge coefficients corresponding to these 128 patterns will be stored in memory.

Writing of a message will therefore be performed by successive calling of frames and not of complete characters.

The formation of inverted characters will therefore also be obtained by calling of frames in a different order.

In the case of an application with characters formed in a 15×10 matrix, for example, the number of possible theoretical patterns is much greater and it can be imagined that, in the limit, all the theoretical patterns cannot be studied or are not available. The coding algorithms will accordingly take into account within a particular loop the availability or unavailability of a pattern and will therefore automatically limit the number of combinations of missing characters.

It should be noted that, by means of this method, the removal of a dot can be extended to 2 or 3 or n according to the total number of dots employed in a character, thereby increasing the variety of coding without impairing the legibility and that this can also be extended to the addition of dots.

Another extreme example can be given by adding to the possibilities of coding either total or partial reverse video writing by letter or by message.

An ink-jet printer of this type prevents inversion of the vertical and horizontal direction as shown in FIGS. 2 and 3 which represent respectively an inverted (E) and an inverted (A). This type of defect can therefore be inserted by the user into the record of items of information written on his product, at any desired point and in accordance with a law of recurrence which the user has defined beforehand and which is known to him alone and to authorized persons. In the example, the lateral arm of the E is constituted by the column (e) whereas in FIG. 3, the top cross-bar of the (A) occupies the row (G) instead of the row (A). It is true that visual legibility is slightly impaired but only a knowledge of the key makes it possible to determine whether the defect considered is accidental or deliberately created.

Another example of practical application of the method in accordance with the invention is illustrated by means of FIG. 4. It can be applied more especially by making use of an ink-jet printer. In fact, a device of this type makes it possible to initiate coalescence of two ink drops and therefore to form characters in which certain dots have different dimensions such as the dots which have respectively the addresses (Ac) and (Fa).

Finally, another example is illustrated by means of FIG. 5, more especially by virtue of the use of an ink-jet printer in which characters of variable height are formed, the height standard being illustrated in FIG. 5 by the straight line xy, knowing that the base zz' is constant. Even if this difference in height ($+\Delta h$ or $-\Delta h$) which is purposely amplified in the figure remains in actual practice sufficiently small to be unnoticeable to the naked eye, it is nevertheless true that it will be automatically detected at the reading level by means of the key defined earlier, that is, at the time of positioning at the level of the reading means of the algorithm on which the writing has been based.

The practical application of such a method in accordance with the invention therefore results in an effective fight against fraud.

The ink-jet printer is more particularly suitable since it can be controlled from a specific algorithm of the product and of its distribution channel. The written information is then decoded at the level of the reading means such as CCD-type cameras provided with a key corresponding to this writing algorithm and, as has already been stated earlier, by virtue of the practical application of a technique for character recognition by column-by-column scanning and identification instead of being apprehended in a general manner as in the prior art.

The applications are numerous and all relate to the products which are intended to bear in particular indications as to origin, preservation period, limiting date of sale, etc.., in the field both of industrial products and of products for general consumption or on the contrary luxury products.

I claim:

1. Method for identification of a product obtained by writing items of information; comprising the steps of introducing at least one defect in a predetermined algorithm; performing the writing operation in matrix form by ink jet printing in accordance with said algorithm, and with the dots in the matrix being isolated from each other; performing a reading operation by scanning and identification of the written dots column by column in such a manner as to ensure that these reading means provided with a decoding key detect and identify the defect which has been purposely introduced, characterized in that said matrix consists of predetermined number of dot positions for said items of information without said defect, and said defect is provided within said predetermined dot positions, and the defect consists of the intentional absence of a writing dot (FIG. 1).

2. Method for identification of a product obtained by writing items of information; comprising the steps of introducing at least one defect in a predetermined algorithm; performing the writing operation in matrix form by ink jet printing in accordance with said algorithm, and with the dots in the matrix being isolated from each other; performing a reading operation by scanning and identification of the written dots column by column in such a manner as to ensure that these reading means provided with a decoding key detect and identify the defect which has been purposely introduced, characterized in that said matrix consists of predetermined number of dot positions for said items of information without said defect, and said defect is provided within said predetermined dot positions, and the defect is constituted by an inversion of the writing.

3. A method according to claim 2, wherein said inversion is a mirror image of at least one item of information (FIG. 2).

4. A method according to claim 2, wherein said inversion is an upside-down writing of at least one item of information (FIG. 3).

5. Method for identification of a product obtained by writing items of information; comprising the steps of introducing at least one defect in a predetermined algorithm; performing the writing operation in matrix form, in accordance with said algorithm, and with the dots in the matrix being isolated from each other; performing a reading operation by scanning and identification of the written dots column by column in such a manner as to ensure that these reading means provided with a decoding key detect and identify the defect which has been purposely introduced, and wherein said writing operation is performed by ink jet printing and characterized in that said matrix consists of predetermined number of dot positions for said items of information without said defect, and said defect is provided within said predetermined dot positions, and the defect is constituted by the deliberately initiated coalescence of two ink drops at one dot location, so that said dot has different dimensions in the written item of information (FIG. 4), and the writing operation is completely performed in a single pass over a media on which the matrix is written.

6. A method in accordance with claim 5, wherein a plurality, but not all of the dots of an item of information have said coalescence of ink drops.

7. Method for identification of a product obtained by writing items of information; comprising the steps of introducing at least one defect in a predetermined algorithm; performing the writing operation in matrix form by ink jet printing, in accordance with said algorithm, and with the dots in the matrix being isolated from each other; performing a reading operation by scanning and identification of the written dots column by column in such a manner as to ensure that these reading means provided with a decoding key detect and identify the defect which has been purposely introduced, characterized in that said matrix consists of a predetermined number of columns and rows of dot positions of said items of information without said defect, and said defect is provided within said predetermined number of rows and dots, and the defect is formed at the level of the height of the characters which varies in the vicinity of a standardized height (xy) having a value $(-\Delta h)$ or $(+\Delta h)$.

8. Method in accordance with claim 7, wherein said writing operation is performed by an ink jet printer.

* * * * *